US005793630A

United States Patent [19]

Theimer et al.

[11] Patent Number: 5,793,630
[45] Date of Patent: Aug. 11, 1998

[54] HIGH PRECISION SPATIALLY DEFINED DATA TRANSFER SYSTEM

[75] Inventors: Marvin M. Theimer, Mountain View; Roy Want, Los Altos; Daniel H. Greene, Sunnyvale, all of Calif.; William M. Newman, Cambridge, Great Britain

[73] Assignee: Xerox Corporation, Stamford, Conn.

[21] Appl. No.: 665,161

[22] Filed: Jun. 14, 1996

[51] Int. Cl.[6] ................................................ H04Q 1/00
[52] U.S. Cl. ................... 364/140.01; 340/825.49; 340/825.45; 340/574; 340/539; 342/44; 348/126; 348/127
[58] Field of Search .................. 364/140, 140.01; 340/825.49, 825.54, 825.72, 574, 539, 825.45, 572; 348/125, 127, 128, 135, 169, 170; 455/521; 342/44

[56] References Cited

U.S. PATENT DOCUMENTS

| 3,506,791 | 4/1970 | Hallaby | 179/41 |
|---|---|---|---|
| 3,739,329 | 6/1973 | Lester | 340/16 R |
| 4,217,588 | 8/1980 | Feeney, Jr. | 343/112 D |
| 4,275,385 | 6/1981 | White | 340/312 |
| 4,303,904 | 12/1981 | Chasek | 340/23 |
| 4,688,026 | 8/1987 | Scribner et al. | 340/572 |
| 4,912,471 | 3/1990 | Tyburski et al. | 342/42 |
| 4,952,928 | 8/1990 | Carroll et al. | 340/825.54 |
| 5,027,314 | 6/1991 | Linwood et al. | 364/900 |
| 5,068,916 | 11/1991 | Harrison et al. | 455/39 |
| 5,099,346 | 3/1992 | Lee et al. | 359/118 |
| 5,115,224 | 5/1992 | Kostusiak et al. | 340/574 |
| 5,119,104 | 6/1992 | Heller | 342/450 |
| 5,122,959 | 6/1992 | Nathanson et al. | 364/436 |
| 5,159,592 | 10/1992 | Perkins | 370/85.7 |
| 5,181,200 | 1/1993 | Harrison | 370/85.1 |
| 5,202,929 | 4/1993 | Lemelson | 382/2 |
| 5,218,344 | 6/1993 | Ricketts | 340/573 |
| 5,353,011 | 10/1994 | Wheeler et al. | 340/572 |
| 5,363,425 | 11/1994 | Mufti et al. | 379/38 |
| 5,396,243 | 3/1995 | Jalink, Jr. et al. | 342/54 |
| 5,493,692 | 2/1996 | Theimer et al. | 455/26.1 |
| 5,515,419 | 5/1996 | Sheffer | 340/539 |
| 5,594,425 | 1/1997 | Ladner et al. | 340/825.06 |
| 5,640,151 | 6/1997 | Reis et al. | 340/825.54 |

OTHER PUBLICATIONS

Friedly, J. "The Office of the 21st Century", *Palo Alto Weekly*, May 6, 1992, pp. 20–24.
Kleiner, A., "The Ultimate Control Chip", *The Programmable World, Popular Science*, May 1992, pp. 90–95.
Schilit, B. N.; Adams, N.; Tso, M. M.,; Want, R., "The PARCtab Mobile Computing System", *PARC Papers at WWOS–IV*, 1993 IEEE and Xerox, pp. 1–6.
Weiser, M., "Some Computer Science Issues in Ubiquitous Computing", *Communications of the ACM*, Jul. 1993, vol. 36, No. 7., p. 84.

*Primary Examiner*—James P. Trammell
*Assistant Examiner*—Hien Vo
*Attorney, Agent, or Firm*—Robert A. Burtzlaff

[57] ABSTRACT

A system for transferring digital information to spatially localizable portable electronic devices has a plurality of portable electronic devices, with each portable electronic device supporting wireless communication. A spatial localizing module determines spatial location with submeter precision for each of the plurality of electronic devices, and a communication module is connected to the spatial localizing module for mediating wireless communication between the portable electronic devices. A user can define electronic data transfers between portable electronic devices in user determined spatial locations with submeter precision. Data transfers are possible to adjacent electronic devices, electronic devices within a defined radius, electronic devices along a defined bearing or having specific orientations, or even located within a defined set of regions or rooms.

9 Claims, 6 Drawing Sheets

HIGH PRECISION SPATIALLY DEFINED DATA TRANSFER SYSTEM

FIELD OF THE INVENTION

The present invention relates to a system that enables transfer of electronic data to electronic devices at predetermined spatial locations. More specifically, the present invention relates to a system for determining position of portable electronic devices with submeter scale precision, and allowing data transfers between portable electronic devices according to their known spatial position.

BACKGROUND AND SUMMARY OF THE INVENTION

Currently available portable computing devices include laptop, notebook, subnotebook, or handheld computers, personal digital assistants, personal organizers, personal communicators (e.g. two way pagers) or digitally readable smart cards. Such portable devices are rapidly becoming more powerful and sophisticated with inclusion of high speed processors, attached harddrives, PCMCIA modem, cursor controllers, and small format keyboard or graphical input device (e.g., for pen based personal digital assistants). As capabilities of these portable devices increase, so does the desire of a user to transfer application specific data. For example, a personal digital assistant can be linked through a wireless connection (radio or infrared) to a desktop computer to transfer contents of an electronic address book. Alternatively, a smartcard can be used to enable financial transactions through debit transfers, while a two way pager can be used to receive and send a limited range of preprogrammed responses.

However, as the number of communicating portable devices having wireless links increase, so does the potential communication problems. As an example, consider transfer of a data file from a first personal digital assistant (PDA) to a second PDA. If a direct wire connection is made between the PDA's, there is no uncertainty as to the recipient of the data file. The user of the first PDA knows that he is transferring data from the first PDA to the second PDA. However, if a wireless communication link mediated by a network is employed, the network address of the second PDA must be known, with various handshake protocols or encryption routines that operate to prevent eavesdropping and ensure transfer of data only to specific devices being manually initiated. Unfortunately, such procedures may limit general transfer of information where the identity of specific devices is not known or readily available.

The problem of unknown device addresses can be minimized if it were possible to direct data to specific spatial locations. As an example, a PDA can be configured to be location sensitive, with a user being able to send data to other spatially specified devices. This function would be particularly advantageous for exchange of information such as "business card" data in a crowded room having many operating PDA's. A user of a first PDA would merely have to depress a button to initiate transfer of information to an adjacent second PDA, without specifically knowing himself the network address, e-mail address, logical address, or other identifying address information of the second PDA. A computer network capable of interacting with both PDA's through wireless links and storing spatial information concerning PDA location receives the information from the first PDA, determines which PDA is adjacent to the first user, and retransmits that information to the second PDA. This spatial functionality is extendible, with users of PDA's being able to direct transmission of business card data to all PDA's in a specified spatial location, in a specified radius or area, or even to specified rooms in a building.

Accordingly, what is needed is a system capable of determining spatial location of other electronic devices, and transmitting or receiving data only to specified electronic devices based on spatial location or orientation of those electronic devices. Preferably, a range of spatial locations and orientations can be specified, with transmission to adjacent electronic devices, to all electronic devices in a room, to all electronic devices in a particular orientation or direction, or even to all electronic devices at spatial locations within a specified range (e.g. within two meters). In terms of user interface, the present invention advantageously allows a user of a portable electronic device to interact more intuitively with other portable devices based on their perceived physical, spatial location, rather than on a logical location defined by their network address or name.

In a preferred embodiment, a computer network having wireless transmission and reception capability is used to maintain information concerning location of all portable electronic devices. Identifying spatial location of multiple electronic devices with a spatial resolution on the order of centimeters or millimeters is enabled by use of a low cost spatial localizing system that employs infrared signaling devices (infrared identification tags) attached or integrated into the electronic devices. The spatial localizing system includes at least two conventional and widely commercially available CCD video cameras having overlapping field of views. The video cameras are capable of detecting both visible light and infrared, and are further configured to provide a sequence of images at predefined frame rates. One or more infrared identification tags for providing modulated infrared signals are positioned in a room or area within the overlapping field of view of the video cameras, and an image processing system is used to extract the modulated infrared signals from the sequence of images and identify the spatial location of the infrared tag using information obtained from both visible light images and infrared images.

Various possible infrared signaling modes of operation are contemplated. In one preferred embodiment infrared identification tags intermittently emit infrared detection signals at a rate less than the frame rate of the video cameras to establish spatial location. The pattern of infrared blinking seen through comparison of multiple frames of the video cameras can be used to positively identify infrared tags and transfer identification information or other data. Advantageously, because multiple infrared identification tags are spatially separated within the same frame of the video camera, identification and tracking of multiple tags in parallel can be achieved. In practice, data acquisition from a room can utilize large numbers of identifying infrared tags attached to objects. In addition to objects such as electronic devices, infrared tags can be deployed to describe particular positions, locations, or areas in a room, providing useful benchmarks for establishing spatial locations.

In certain embodiments, multiple tags attached to a movable object can be used to determine and track orientation, as well as location, of the object. This permits data transfer to be defined in relation to the orientation of an electronic device. For example, a command to transfer data to other electronic devices to the left of a particular user's electronic device is possible. As an additional advantage, use of two or more attached tags could allow determination of the angle of rotation of an object. Use of multiple tags also alleviates problems associated with obscuration of an object or electronic device, and increases accuracy of position determination. Further, multiple identification tags can be used to increase the rate of data transfer.

Alternative embodiments, including the use of visible light instead of infrared, or variant position and data encoding schemes for infrared signals, are also contemplated within the scope of the present invention. For example, it is possible to use a separate infrared communication channel receiver for reception of infrared identification signals that are emitted substantially time coincident with infrared detection signals used to establish spatial location of the infrared tag. Using time coincidence methods, it is possible to transfer identification data at much higher rates than the relatively slow data transfer rates possible using multiple frame comparisons from the video cameras alone. In addition, to reduce power requirements it is possible to use passive infrared reflectors as tags (with a separate, room mounted infrared flasher providing infrared light on demand), or to use infrared identification tags that are activated only in response to an identification request.

Advantageously, the present invention uses relatively inexpensive and commonly available components such as infrared transmitters and CCD video cameras to provide highly precise spatial localization of tagged electronic devices. Suitable high quality CCD video cameras are widely employed for consumer security systems. Because of the economies of scale, such CCD video cameras are quite inexpensive, making them ideal for this application.

Since infrared signals are invisible to the human eye, yet easily visible to CCD video cameras, the infrared signaling system is essentially invisible to users, while still being easy for automated systems to locate and interpret without elaborate image processing techniques. The present invention can be quickly implemented after computer network connected video cameras are installed, and does not require complex setup or initialization. Using a limited number of inexpensive video cameras, the present invention allows for tracking spatial location of large numbers of tagged electronic devices, enabling data transfer between electronic devices situated at specified spatial locations with sub-meter precision via a suitably configured computer network.

Additional functions, objects, advantages, and features of the present invention will become apparent from consideration of the following description and drawings of preferred embodiments.

DETAILED DESCRIPTION OF THE INVENTION

Figure 1:
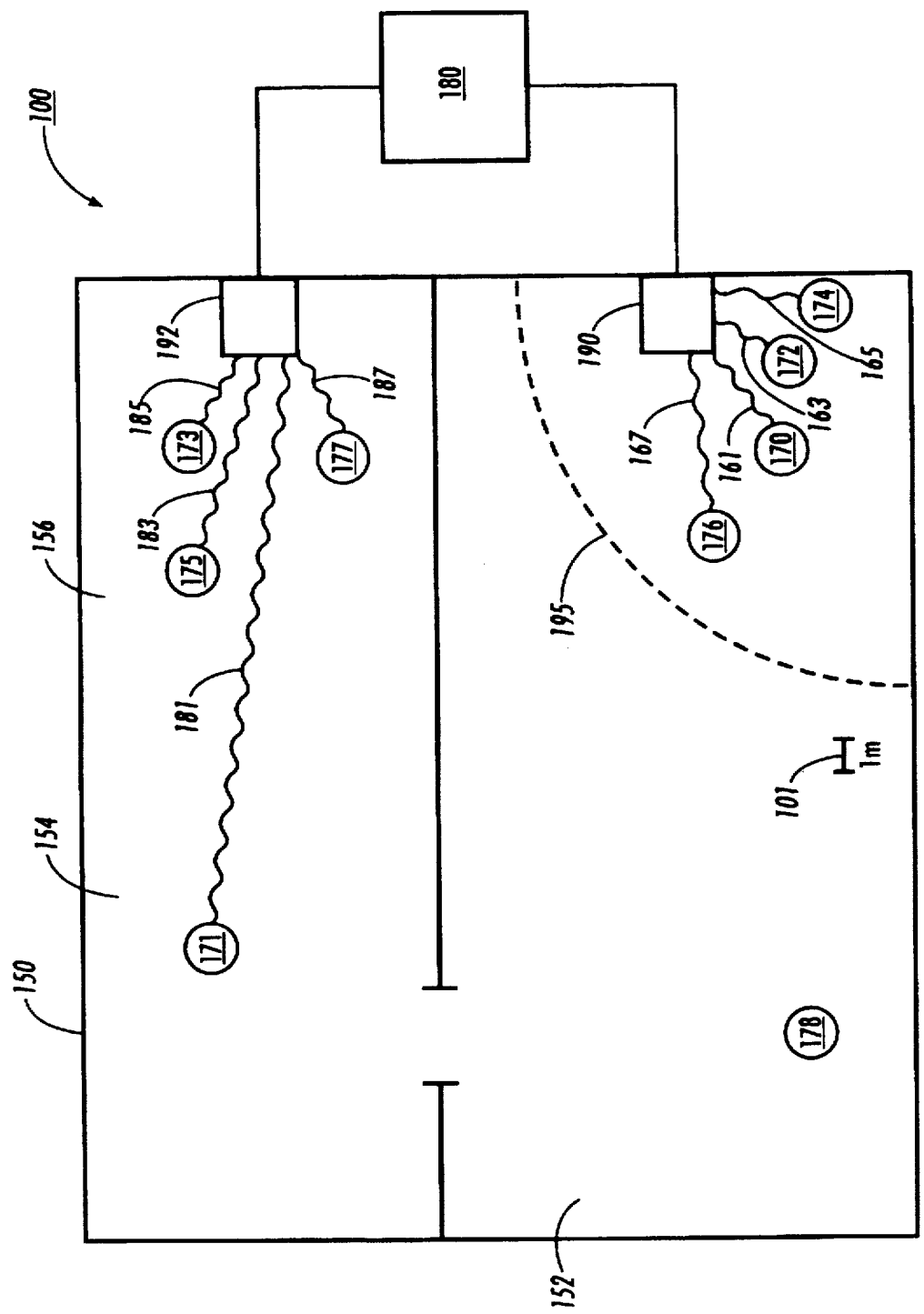
FIG. 1 is a schematic outline for a high precision spatially defined data transfer system.

FIG. 1 illustrates a system 100 for enabling transfer of electronic data to electronic devices at predetermined spatial locations. The system 100 includes a plurality of spatial localizing modules 190 and 192 that function to detect absolute spatial location of particular electronic devices. The spatial localizing modules 190 and 192 track spatial positions of electronic devices and additionally provide a mechanism for electronic data transfer in conjunction with computer network 180. As those skilled in the art will appreciate, the position and size, and number of spatial localizing modules 190 and 192 is only representative, and not intended to limit the present invention. Similarly, the computer network 180 may include multiple computers, workstations, specialized image processing hardware, servers, or other information processing and connectivity hardware. Multiple spatial localizing modules connected to network 180 can be used, and a wide variety of mechanisms for determining spatial location can be employed, including image based techniques, ultrasound or other acoustic techniques, or even radio based techniques such as differential GPS.

In FIG. 1, the spatial localizing modules 190 and 192 track a plurality of electronic devices, indicated as circles 170–178. The electronic devices are distributed throughout two rooms 152 and 154 of a building 150, with a spatial localizing module respectively located in each room. A scale marker 101 representing a distance of one meter is shown for scale. The electronic devices 170–178 in the building 150 may be, for example, personal digital assistants, two-way pagers, laptop or notebook computers, computer tablets, or any other electronic device capable of wireless communication through radio, infrared, acoustic or other transmission links. In FIG. 1, communication links for data transmission are generically illustrated by wavy lines 161, 163, 165, 167, and 181,183,185, and 185.

In operation, the system 100 is capable of determining both relative and absolute spatial location of other electronic devices with submeter precision, and mediate transmission or reception of data only to specified electronic devices 170–178 based on the relative or absolute spatial location of those electronic devices. In certain preferred embodiments discussed later in connection with FIG. 2, centimeter or even millimeter scale spatial localization is possible, however, for many applications submeter precision is adequate. Data transmission to or between electronic devices based on spatial location criteria can take many forms. For example, a user with electronic device 170 may desire to transmit data only to an adjacently located electronic device 172. The user can merely depress an appropriate button, use a mouse to click a menu command such as "transfer adjacent", or other suitable initiating action, to initiate a data transfer to device 172. The system 100, operating with submeter precision, is able to determine that the spatial location of other nearby electronic devices 174 and 176 are not as close to device 170 as adjacent electronic device 172, and accordingly not direct data to those other nearby electronic devices.

Instead of transfer just to an adjacent electronic device, another possible mode of spatially limited data transfer uses transfer to electronic devices within a certain radius. For example, a user of electronic device 170 could transmit data to all devices within about 5 meters. All electronic devices 172, 174, and 176 within that radius (indicated generally by dotted line 195) would be able receive a data transmission, while an electronic device 178 outside dotted line 195 would not receive a data transmission. This mode of data transfer is particularly useful in larger rooms with groups of people independently interacting. Inter-room transfers are yet another mode of data transfer enabled in a building 150 equipped with a system 100. For example, a user could send electronic data to all electronic devices 171, 173, 175, and 177 in room 154, without sending that data to any electronic devices in room 152. Still another mode of directed data transmission based on spatial location can be enabled with electronic devices having a graphical user interface capable of displaying a schematic such as illustrated by FIG. 1. Using a mouse, pointer, cursor, or other suitable interface mechanism, a user could inspect the absolute or relative spatial locations of electronic devices and graphically select those electronic devices that are to receive (or not receive) a data transmission. Advantageously, the present invention allows a user of a portable electronic device to interact more intuitively with other portable devices based on their perceived physical and spatial location, with selective data transfer possible using essentially any spatial description typically employed by a user. The user of an electronic device does not need to know a logical location defined by the network address or other obscure specification to interact with other electronic devices, only the perceived spatial location on whatever spatial scale is needed, from submeter to building wide.

Figure 2:
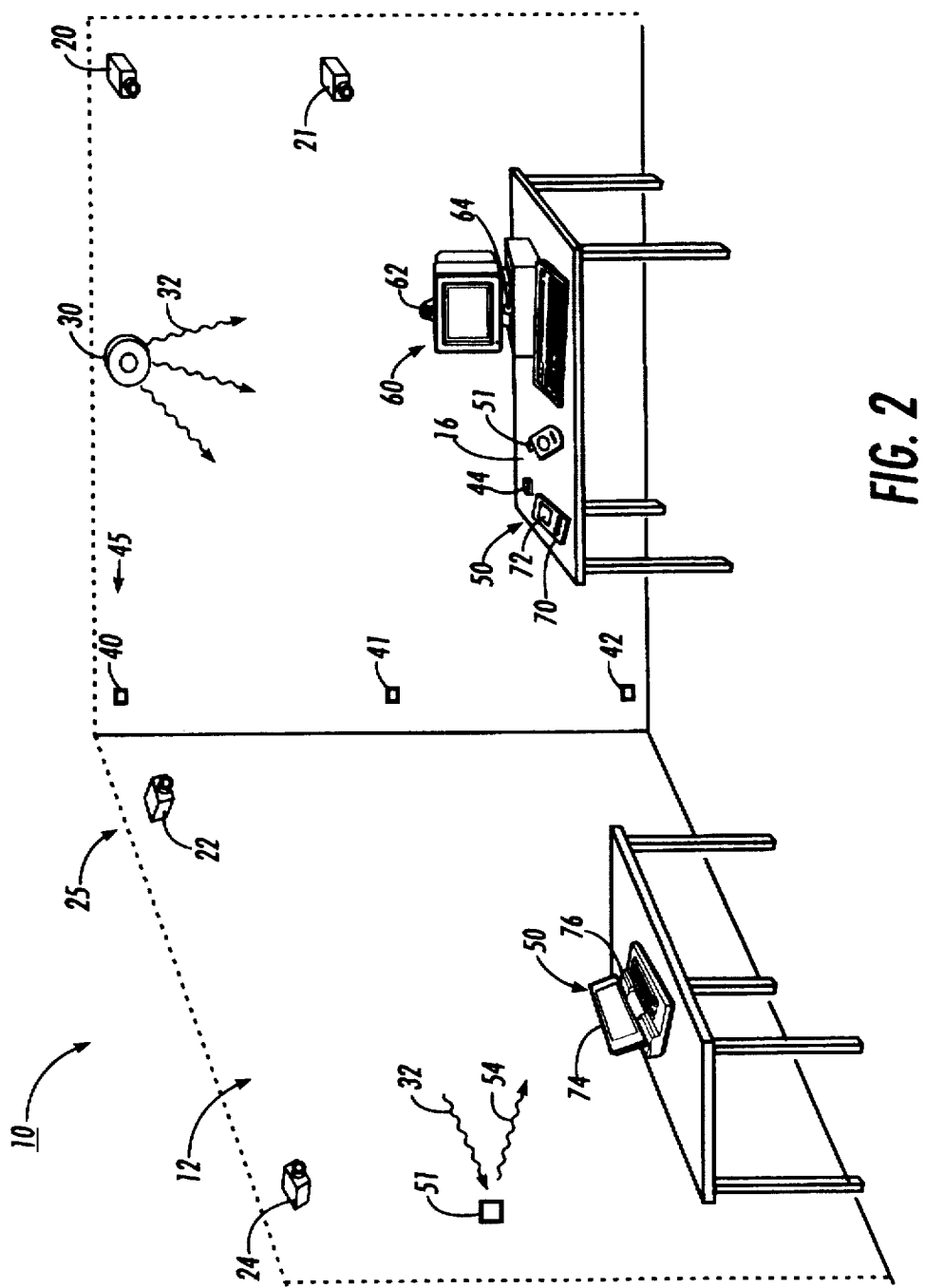
FIG. 2 is a schematic outline of a CCD camera based system for precisely locating the spatial location of electronic devices tagged with infrared identification tags.

As those skilled in the art will appreciate, a key aspect of the present invention is use of a mechanism for quickly and efficiently determining the spatial location of electronic devices with submeter scale precision. For best results, millimeter scale location systems can be used, although centimeter scale absolute position location ordinarily suffices for many data transfer applications. FIG. 2 is an example of a system 10 for precisely locating infrared signal sources 45 (infrared tags) with centimeter or less scale precision. The system 10 includes multiple CCD video cameras 25 positioned in room 12. These video cameras 25 may have a fixed view, such as CCD video cameras 20, 21, 22, and 62, or they may have a movable view such as provided by movable CCD video camera 24. Infrared signal sources 45 suitable for spatial localization can be positioned on static or essentially immovable objects such as walls (tags 51, 40, 41, and 42), or desks (tag 44) to help define spatial boundaries and regions. Infrared signal sources 45 can also be positioned on readily movable objects such as a portable electronic device 70 (tag 72) or device 74 (tag 76). Image processing for spatial localization and data utilizes a computer system, in this example illustrated by a computer system 60. The computer system 60 can of course be located outside room 12, and there is no special requirement for any local computer process control. The computer system is connected by wireless or wired links to video cameras 25, and may be stand-alone or connected to a computer network for distributing image processing duties and allowing for high speed data transfer.

The present system 10 advantageously utilizes emitted infrared signals that are invisible to the human eye yet easily visible to CCD cameras 25. After suitable image processing, the emitted infrared signals from multiple infrared tags provide three dimensional spatial localization for each of those multiple infrared tags. The emitted infrared signals are typically intermittent point source flashes of infrared light (infrared blinks) that appear, along with the visual light image, on frames of CCD video cameras. Since the cameras 25 typically provide between about 10 to 30 frames per second of image data, the blink rate is selected to be less than about 5 to 15 blinks per second to ensure capture of infrared images without aliasing problems. Subtractive image processing between adjacent image frames or other suitable image processing technique is used to enhance and separate the infrared signal from the visual background, allowing the two dimensional spatial pattern of infrared blinks in each image processed frame to be determined. Advantageously, the image processing techniques required to enhance and differentiate infrared point sources in a predominantly visible light image for operation of the present system can be relatively unsophisticated, and do not require elaborate image understanding algorithms.

After two dimensional detection of infrared signal sources is completed, the frames from multiple cameras 25 can be spatially multiplexed using conventional image processing techniques to derive a three dimensional spatial localization of each infrared signal source in room 12. To maximize coverage and ensure three dimensional localization, cameras 25 are arranged so that some combination of at least two cameras have an overlapping field of view on every part of room 12. Each camera 25 can be calibrated to allow for spatial localization through the use of reference objects or camera platform control. For example, a fixed camera 20 having a fixed focal length is calibrated to allow for computation of the angle of two rays entering its lens based on location of two spots in its image. As will be appreciated by those skilled in the art, this angle can be computed from a published focal length of the lens. If necessary, limited experiments can be undertaken to determine an exact mapping that compensates for differing focal lengths and lens distortions. Calibration continues by providing appropriate infrared signal sources at a known distance from a positioned camera that are used as permanent or semi-permanent reference sources for allowing computation of ray angles. Typically, these reference sources are located at junctions of a room (for example, tags 40 and 42 can be used). A new object (such as, for example, infrared tag 41) can be located provided that at least one camera can provide an image of the new object and two reference sources, while a second camera can image the new object and at least one reference source. With additional infrared reference sources detectable by multiple cameras, it is even possible to extend the method so that camera location with respect to the reference sources need not initially be known.

Figure 7:
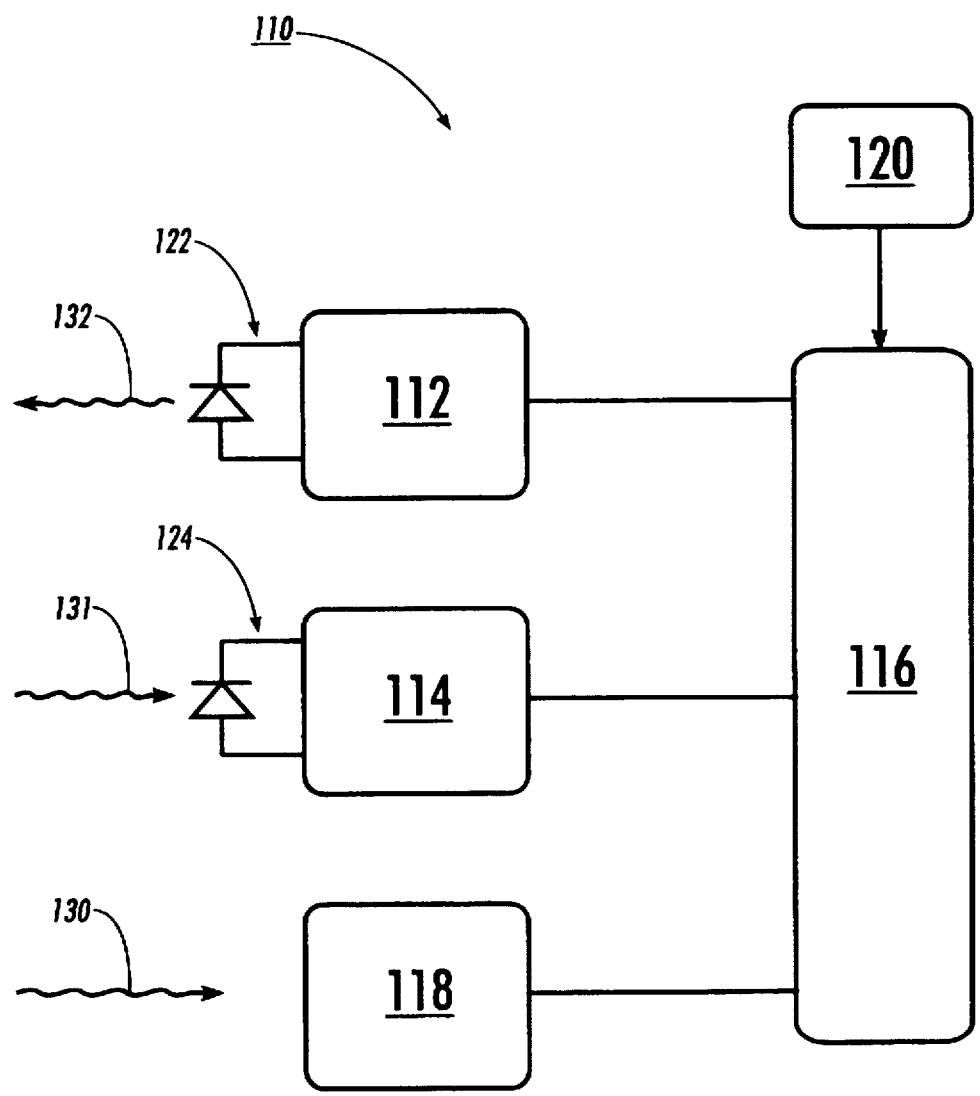
FIG. 7 schematically illustrates construction of an active infrared tag.

A wide variety of infrared signal sources 45 can be used for camera calibration, spatial localization, identification, and data transfer. For purposes of the present invention, the infrared signal sources 45 can be conceptually divided into active infrared tags 50 that internally generate infrared light 52 (e.g. tag 72 on portable electronic device 70), or passive infrared tags 51 that controllably reflect incident infrared light 54 in response to incident infrared light 32 provided by an infrared light source 30. Active infrared tags are generally larger and more expensive than passive infrared tags, requiring a battery or other power source, an infrared emitter such as an infrared LED, and a suitable digital controller. For example, as seen with reference to FIG. 7, an active infrared tag 110 can be built by interconnecting four conventional and widely available modules, including a buffer 112 with IR transmitter LED 122; an amplifier 114 with IR detector 124; a microcontroller 116; and a trigger circuit 118. A lithium battery, photoelectric cell, or other long life power source 120 supplies a low voltage power source for driving the modules. In the default state modules 112, 114, and 116 are held in a power-down mode. The fourth module, the trigger circuit 118, is always active but is designed to operate with a very small power-consumption. When the trigger circuit 118 is activated by an external signal 130 such an infrared or optical pulse, the modules 112, 114, and 116 are powered. Addressing signals 131 may be received at module 114, decoded by module 116 and then a response signal 132 sent back using transmitter LED 122 from module 112. The microcontroller module 116 keeps track of time and after some number of milliseconds or the lack of receiver activity, will return itself (module 116), along with modules 112 and 114, to the power-down state. The response signal 132 (infrared pulses) incorporates the identity of the active infrared tag, along with any desired data.

As will be appreciated, many differing types of trigger circuit can be employed. A simple implementation of a trigger circuit includes a low-power astable-oscillator with a long and slightly random period (to avoid repeated tag-signal collisions). The trigger circuit could also be designed to be activated by a particularly intense IR flash or it might use another medium such as the reception of a particular radio frequency. In certain contemplated embodiments, the trigger circuit can be designed to render the IR detection/amplification module 114 unnecessary.

Passive infrared tags 51 are an inexpensive alternative to active infrared tags 50. Passive infrared tags 51 controllably reflect infrared light 32 provided by an infrared light source 30. The infrared light source 30 can be continuously, intermittently, or periodically operated as required. In the illustrated embodiment, the passive infrared tags 51 each include an infrared reflecting material covered by an alternately light transmissive or light absorptive shutter. Typically, the shutter is an electrically controlled liquid crystal display (LCD) that normally does not transmit substantial amounts of infrared light. A low power electrical signal is applied to convert the shutter from this infrared nontransmissive state to a substantially transmissive state. By appropriately switching between an infrared light transmissive and non-transmissive state, information can be coded in the pattern of infrared reflections 54 from infrared tags 51 that are detected by cameras 25.

As will be appreciated by those skilled in the art, various activation, data transmission, and timing modifications to both infrared light source 30 and passive infrared tags 51 are possible to enhance reliability of information transfer and conserve power. Using techniques similar to that already discussed in connection with active infrared tags 50, the passive infrared tags 51 can be activated to transmit identification codes and other data in response to an infrared trigger signal. This avoids the need for continuous activation of the LCD shutter mechanism and greatly reduces long term power requirements. As with the active infrared tags 50, multiple passive tags can be simultaneously operated, since the spatial localizing camera system of the present invention can unambiguously distinguish between multiple passive tags 51 transmitting information in response to the same activation signal.

Figure 3:
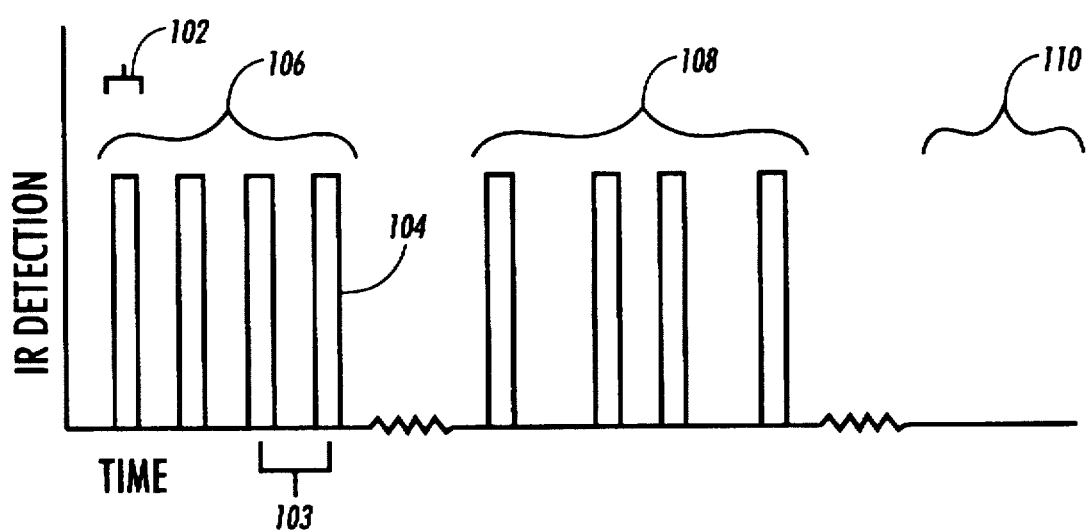
FIG. 3 is a graph illustrating infrared pulse intensity versus time, with periodic pulses to establish position followed by data pulses to transfer information being shown.

Various information transmission and signaling schemes are suitable for use in the present invention. One preferred scheme, indicated with particular reference to FIGS. 3 and 4, can be employed by either an active infrared tag 50 or passive infrared tag 51, as desired. FIG. 3 is a graph illustrating IR pulse detection versus time, with three distinct modes of pulsed operation shown. Operation of a tag 50 or 51 in locating or initialization mode is represented by a series of detected periodic infrared pulses 104 identified by bracket 106. To conserve power, these pulses 104 may actually consist of multiple brief infrared spikes or pulses, at a rate high enough to ensure apparently continuous detection of an infrared signal by the cameras throughout each pulse 104. Of course, IR intensity can be continuously maintained, rather than pulsed, for the duration of each pulse 104 if power is not limited.

The periodic detected infrared pulses 104 allow for detection of the three dimensional location of a tagged object (e.g. electronic device 70 or 74) by cameras 25 and determination of pulse separation 103 between sequential pulses 104. As will be appreciated, to prevent aliasing errors and accurately determined pulse separation, cameras 25 are operated at a frame rate 102 substantially faster than pulse separation 103, with a frame rate two to three times as fast as pulse separation being suggested.

After a brief time (less than a second) periodic blinking is stopped, and transfer of identification information and data commences. Data transfer through blinking of tags 50 or 51 is identified by bracket 108. Absence of a pulse 104 is interpreted as a binary "0", while presence of a pulse 104 is interpreted as a binary "1". As will be appreciated, this allows for information encoding through any number of binary encoding schemes. For best results, use of one or more of the many available error correcting codes are preferred. After identification information and data is sent (after possible multiple resendings), the infrared pulses 104 from tags 50 or 51 can be stopped as indicated by bracket 110 to conserve power. The tags can of course be reactivated at predetermined times, random times, or in response to activation signals as desired.

Figure 4:
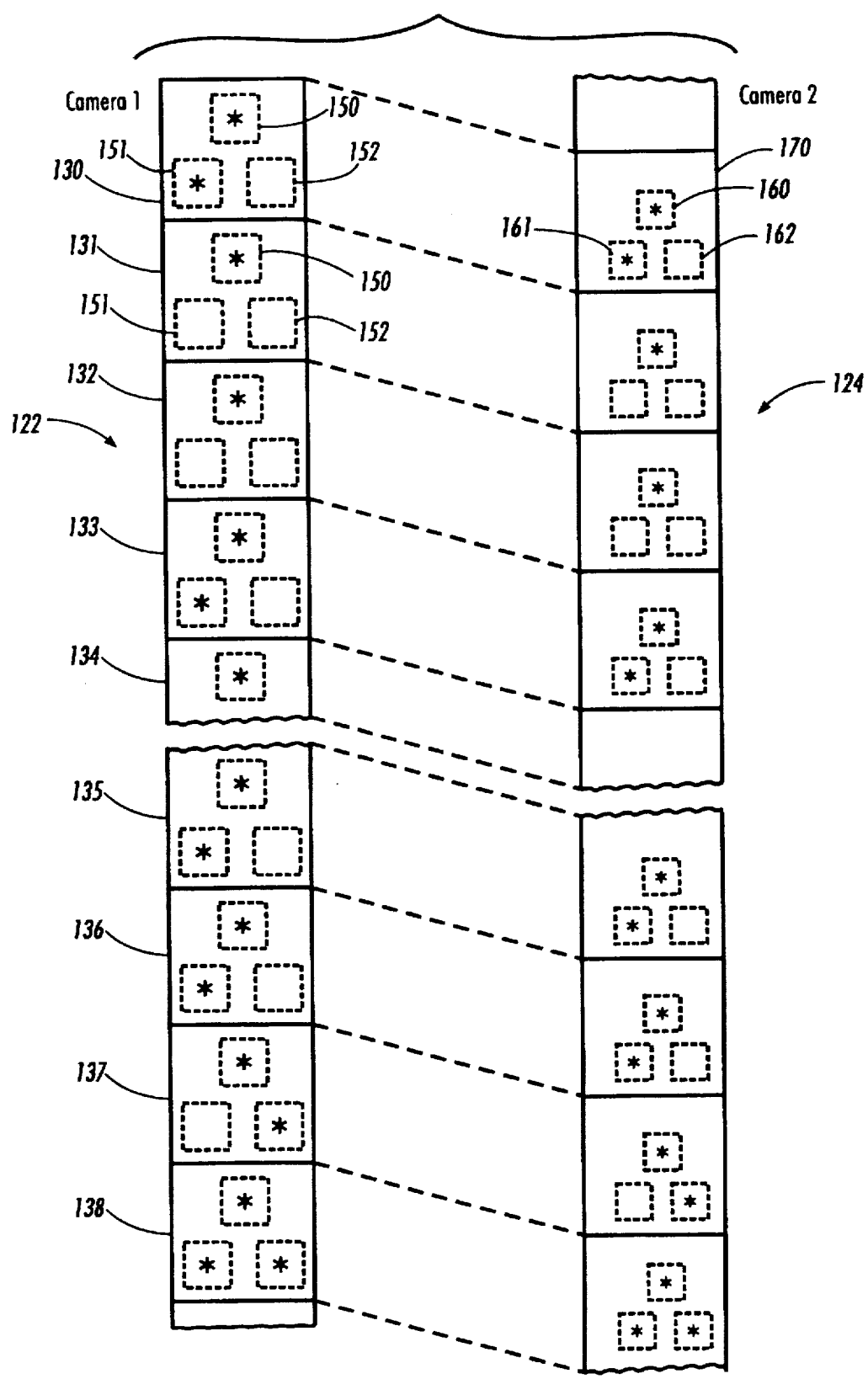
FIG. 4 illustrates selected image processed frames of two video cameras showing blinking infrared data signals capable of being correlated to determine spatial position.

Detection by cameras 25 of infrared pulses to allow for spatial localization and information transfer is schematically indicated in FIG. 4. Two sequences of processed image frames 122 (camera 1) and 124 (camera 2) are illustrated. The cameras have a partially overlapping field of view with three potential infrared pulse sources. Each frame in the sequences 122 and 124 are composite images of several frames, with noninfrared background visual information subtracted to isolate the infrared pulses.

In frame 130 of camera 1, potential positions 150, 151, and 152 of infrared pulses (represented by an asterisk) are indicated by dotted outline. These positions correspond to potential positions 160, 161, and 162 in frame 170 of a differently positioned camera 2. Using image processing techniques such as previously described, the infrared pulses are isolated in frames 122 and 124 of camera 1 and camera 2 and used as reference points. Two dimensional information from each camera is acquired, and merged with calibration information to derive the three dimensional position of the infrared pulse.

The three distinct modes of pulsed operation are shown in the frames 122 and 124. Operation of an infrared tag 50 or 51 in locating or initialization mode is represented by periodic infrared pulses at position 150. With each composite and image processed frame 130–138 representing a single pulse separation (corresponding to pulse separation 103 of FIG. 3), an infrared pulse is seen at position 150 in each frame 130–138 of frame sequence 122. A corresponding infrared pulse is of course also seen at position 160 in frame sequence 124 for camera 2. This is equivalent to the series of periodic infrared pulses 104 identified by bracket 106 in FIG. 3.

Information transfer from another infrared tag is shown through a periodic blinking of infrared pulses at position 151 in frames 130–138 of frame sequence 122 (and the corresponding position 161 in frame sequence 124). Absence of an infrared pulse in a frame is interpreted as a binary "0"

(e.g. frames 131,132, and 137), while presence of an infrared pulse is interpreted as a binary "1" (e.g. frames 130, 133, 135, 136, 138). Accordingly, as illustrated in FIG. 4, the binary sequence "1001 . . . 1101" can be determined. This binary sequence can be header information, data, identification, packet control information, error correction information, or any other necessary information that might be transmitted from tags 50 or 51.

As previously noted, after appropriate identification information and data is sent, the infrared pulses can be stopped to conserve power. The tags can of course be reactivated to again identify location of tags and transfer identification information and other data. In FIG. 4, this is illustrated by the pattern of infrared pulses at position 152 in frame sequence 122 (and the corresponding position 162 in frame sequence 124). To conserve power, no infrared pulses are emitted during a time period covering frames 130-136. In response to an activation signal, a periodic series of infrared pulses is emitted for localization and initialization purposes, as seen in frames 137 and 138.

In operation, the present system allows for tracking of multiple portable objects (e.g. an electronic device 70 or 74 with respectively attached tag 72 and 76). Advantageously, large numbers of portable objects can be tracked in parallel with high spatial precision, without requiring use of sophisticated tracking techniques to determine tag identification.

However, without the use of high speed cameras, the major limitation of the foregoing embodiment is its relatively low data transfer rate. Because bit transfer is closely associated with the frame rate of the cameras, the relatively low frame rate of widely available low cost cameras limits the theoretical data transfer rate to 10 or 20 bits per second. In practice, because of the necessary overhead associated with error control, bit transfer rates will be even lower. One possible way of overcoming this problem is the use of secondary high speed data communication channels for data transfer, while low data transfer rate infrared pulse/camera detection systems are used for spatial localization. One example of a dual communication channel system is illustrated in FIGS. 5 and 6.

Figure 5:
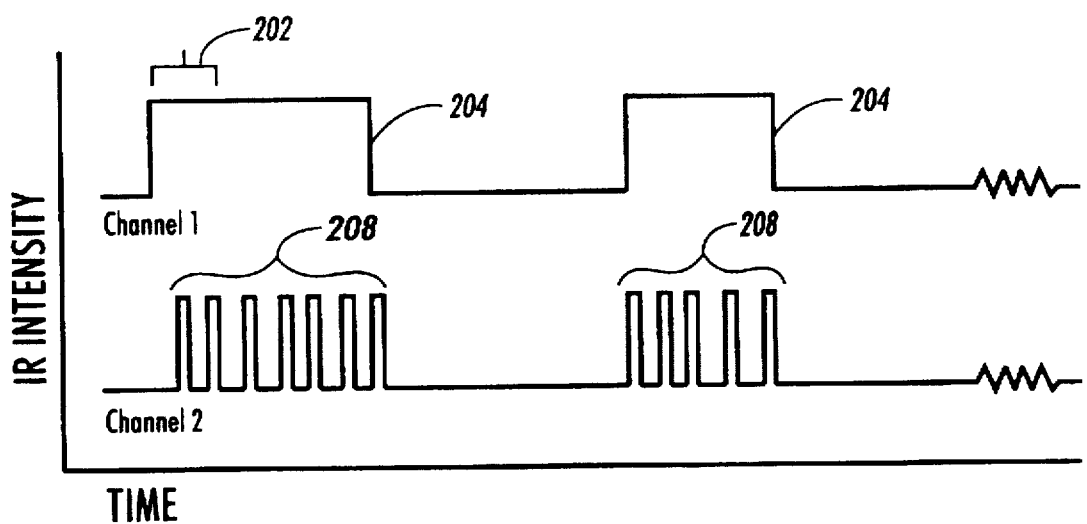
FIG. 5 is an alternative pulse scheme using two substantially time coincident communication channels to determine position and transfer data.

FIG. 5 is a graph illustrating IR detection versus time for two separate infrared communication channels. Infrared pulses 204 of communication channel 1 are detected by cameras operating at a frame rate 202, using processes described in connection with FIGS. 3 and 4. A separate, higher speed infrared communication channel 2 with much shorter infrared pulses is detectable by a separate (non-camera based) infrared communication system. In preferred embodiments, infrared pulses in accordance with applicable IRDA (Infrared Data Association) standards can be used for data transfer on channel 2, although any high speed communication channel, including radio or optical messaging, can be used. In operation, the infrared pulses of channel 1 are used for spatial localization of an infrared tag, while a time coincident communication on channel 2 provides high speed data transfer. For example, in FIGS. 1 and 2, a high speed infrared communication system operating at about 19.2 kilobits per second includes an infrared tag 57 and a high speed infrared detector 64 attached to computer 60. Spatial localization is provided by cameras 25 detecting low speed infrared pulses, while any time coincident data received on the high speed channel is associated with a tag at the identified spatial location. Of course, use of time coincident communication results in a somewhat reduced data throughput due to statistically determinable data collisions (when two or more tags simultaneously transmit data, resulting in destructive data overlap), but is adequate for most situations.

Figure 6:
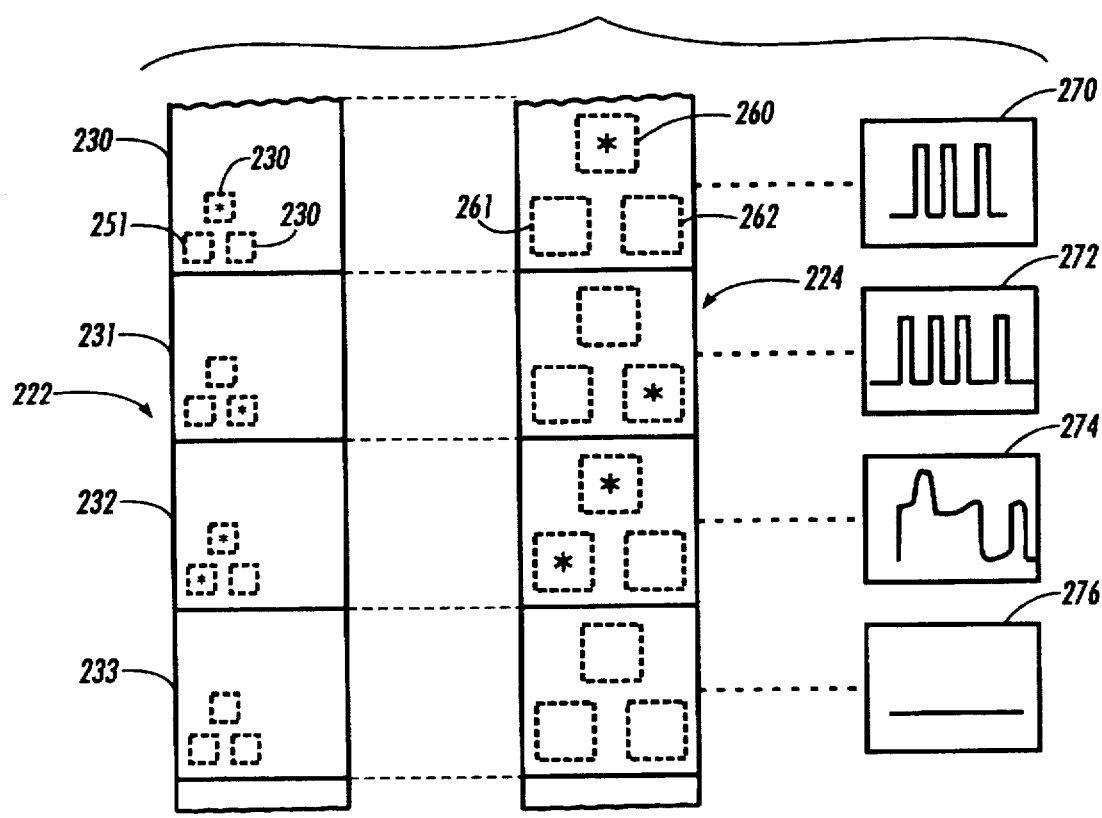
FIG. 6 illustrates selected image processed frames of two video cameras operating in accordance with the alternative pulse scheme of FIG. 5, with blinking infrared data signals capable of being correlated to determine spatial position on a first communication channel, and data provided on a substantially time coincident second communication channel.

Time coincident data transfer methods in accordance with the present invention can be better understood with reference to FIG. 6. Two image processed frame sequences 222 and 224 taken from different cameras are illustrated, along with an example of high speed data (boxes 270, 272, 274, and 276) time coincidently received with the indicated frames. Data can be received from three separate tags located at three different spatial positions (positions 250, 251, and 252 frame sequence 222, positions 260, 261, and 262 in frame sequence 224). Using previously discussed techniques, an infrared pulse (denoted by an asterisk) can be positively located in three dimensions given the two dimensional frame sequences 222 and 224. If possible, the spatial location data is correlated with the high speed data to provide spatial localization of a specifically identified tag attached a portable electronic device or other object.

FIG. 6 illustrates several possible outcomes for time coincident spatial localization methods in accordance with the present invention. Frame 230 shows a spatially localizable infrared pulse at position 250. Time coincident data 270 is attributed to a tag emitting the infrared pulse position at position 250, assuming there is no data collision. Data collision can occur when two or more data packets are simultaneously received, or when the spatially localizable infrared pulses overlap. Frame 231 illustrates one situation without data collision, with an infrared pulse at position 252 being correlated with identification data 272. However, if two or more tags are active during the same time period, as seen in frame 232, the received signal 274 is the garbled result of a data packet collision, and the signal is ignored. After preprogrammed random delays (seen in frame 233) or active requests to retransmit, the tags are again activated, with hopefully non-overlapping data transfer to allow for unique identification. Note that in certain cases of infrared pulse overlap, a data collision does not necessarily occur, and it may be possible to link spatial location and data through consideration of previously received infrared spatial locations.

Although the foregoing combination of infrared tags and CCD cameras are a preferred low cost system for spatial localization of portable electronic devices, alternative techniques for spatially localizing electronic devices with centimeter scale precision can also be used. For example, systems based on differential GPS, ultrasound ranging, inertial tracking, or multiple station, low power radio reception can be used. However, these alternative systems are generally more difficult to calibrate, control, and maintain at centimeter scale precision than the foregoing infrared tag tracking system using CCD video cameras.

While the present invention has been described in conjunction with specific embodiments thereof, it is evident that many alternatives, modifications, and variations will be apparent to those skilled in the art. Accordingly, the various embodiments described herein should be considered illustrative, and not limiting the scope of the present invention as defined in the following claims.

The invention claimed is:

1. A system for transferring digital information to spatially localizable portable electronic devices, the system comprising
 a plurality of portable electronic devices, each portable electronic device supporting wireless communication,
 a spatial localizing module having an image processing system for determining spatial location of each of the plurality of electronic devices, and
 a communication module connected to the spatial localizing module for mediating wireless communication between a first portable electronic device and those members of the plurality of portable electronic devices in a user defined spatial location.

2. The system of claim 1, wherein the user defined spatial region further comprises an electronic device adjacent to a first electronic device.

3. The system of claim 1, wherein the user defined spatial region further comprises those electronic devices within a predetermined radius of a first electronic device.

4. The system of claim 1, wherein the user defined spatial region further comprises those electronic devices within at least one room defined by a user with a first portable electronic device.

5. A system for transferring digital information to spatially localizable portable electronic devices, the system comprising a plurality of portable electronic devices, each portable electronic device supporting wireless communication, a spatial localizing module for determining spatial location of each of the plurality of electronic devices, the spatial localizing module having at least two video cameras capable of detecting infrared light, each of the video cameras being configured to provide a sequence of images, at least one infrared tag attached to at least one of the plurality of portable electronic devices for providing modulated infrared signals, an image processing system configured to extract modulated infrared signals from the sequence of images and identify the spatial location of each of the infrared tags attached to the portable electronic devices, and a communication module connected to the spatial localizing module for mediating wireless communication between a first portable electronic device and those members of the plurality of portable electronic devices in a user defined spatial location.

6. A method for transferring digital information to spatially localizable electronic devices, the method comprising the steps of determining spatial location of each of a plurality of electronic devices with an image processing system, selecting a user defined spatial region for communicating with the plurality of electronic devices, and facilitating wireless communication between a first portable electronic device and those members of the plurality of portable electronic devices in the user defined spatial region.

7. The method of claim 6, wherein the step of selecting a user defined spatial region further comprises the step of selecting an adjacent electronic device for communication with a user held first portable electronic device.

8. The method of claim 6, wherein the step of selecting a user defined spatial region further comprises the step of selecting at least one room containing at least some of the plurality of electronic devices for communication with a user held first portable electronic device.

9. A system for precisely locating electronic devices with attached identification tags comprises at least two video cameras, with each video camera configured to provide a sequence of images at a first frame rate, an identification tag attached to an electronic device for providing a series of spaced apart signals at a second frame rate defined to be less than the first frame rate, with the signals being perceptible by the video camera, an image processing system configured to extract the three dimensional spatial location of the identification tag from the sequence of images.

* * * * *